United States Patent
Glazemakers et al.

(10) Patent No.: US 10,412,048 B2
(45) Date of Patent: *Sep. 10, 2019

(54) PROTECTING NETWORK DEVICES BY A FIREWALL

(71) Applicant: Cryptzone North America, Inc., Waltham, MA (US)

(72) Inventors: Kurt Glazemakers, Grembergen (BE); Per Johan Allansson, Kungsbacka (SE); Thomas Bruno Emmanuel Cellerier, Kungälv (SE); Kosmas Valianos, Göteborg (SE); Tom Viljo Weber, Kode (SE)

(73) Assignee: CRYPTZONE NORTH AMERICA, INC., Waltham, MA (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/488,132

(22) Filed: Apr. 14, 2017

(65) Prior Publication Data
US 2017/0230333 A1    Aug. 10, 2017

Related U.S. Application Data

(63) Continuation-in-part of application No. 15/053,422, filed on Feb. 25, 2016, now Pat. No. 9,628,444.
(Continued)

(51) Int. Cl.
*H04L 29/06* (2006.01)
*H04L 12/911* (2013.01)

(52) U.S. Cl.
CPC .......... *H04L 63/0236* (2013.01); *H04L 47/70* (2013.01); *H04L 63/029* (2013.01);
(Continued)

(58) Field of Classification Search
CPC ....... H04L 63/20; H04L 63/101; H04L 63/10; H04L 63/0272; H04L 63/02;
(Continued)

(56) References Cited

U.S. PATENT DOCUMENTS

| 5,889,942 A | 3/1999 | Orenshteyn |
| 6,381,631 B1 | 4/2002 | Van Hoff |

(Continued)

FOREIGN PATENT DOCUMENTS

| EP | 1782265 | 5/2007 |
| EP | 2144460 | 1/2010 |

(Continued)

OTHER PUBLICATIONS

European Patent Application No. 15848610.0, extended European search report, dated Sep. 5, 2017.
(Continued)

*Primary Examiner* — Tae K Kim
(74) *Attorney, Agent, or Firm* — Greenberg Traurig, LLP

(57) ABSTRACT

Systems and methods provide for management of a gateway. In one embodiment, a method includes: in response to a request from a client device, establishing, by a computer system implementing a gateway to a private network, a network tunnel between the client device and the gateway; and starting a firewall service with a set of firewall rules on the computer system for selectively blocking and allowing network traffic between the client device and one or more network devices in the private network.

20 Claims, 6 Drawing Sheets

Related U.S. Application Data

(60) Provisional application No. 62/292,702, filed on Feb. 8, 2016.

(52) U.S. Cl.
CPC ...... *H04L 63/0263* (2013.01); *H04L 63/0272* (2013.01); *H04L 63/101* (2013.01)

(58) Field of Classification Search
CPC ............ H04L 63/0263; H04L 63/0227; H04L 63/0236; H04L 63/14; H04L 63/029
See application file for complete search history.

(56) References Cited

U.S. PATENT DOCUMENTS

| | | |
|---|---|---|
| 6,766,454 B1 | 7/2004 | Riggins |
| 6,898,710 B1 | 5/2005 | Aull |
| 7,245,619 B1 | 7/2007 | Guan et al. |
| 7,444,518 B1 | 10/2008 | Dharmarajan et al. |
| 7,574,737 B1 | 8/2009 | Loh |
| 7,661,131 B1 | 2/2010 | Shaw et al. |
| 7,665,130 B2 | 2/2010 | Johnston et al. |
| 7,673,048 B1 | 3/2010 | O'Toole, Jr. et al. |
| 7,721,084 B2 | 5/2010 | Salminen et al. |
| 7,809,003 B2 | 10/2010 | Makela |
| 7,849,495 B1 | 12/2010 | Huang et al. |
| 7,904,952 B2 | 3/2011 | Yeap et al. |
| 7,954,144 B1 | 5/2011 | Ebrahimi et al. |
| 8,001,610 B1 | 8/2011 | Chickering et al. |
| 8,028,071 B1 | 9/2011 | Mahalingam et al. |
| 8,353,021 B1 | 1/2013 | Satish et al. |
| 8,429,232 B1 | 4/2013 | Appenzeller et al. |
| 8,549,173 B1 | 10/2013 | Wu et al. |
| 8,549,300 B1 | 10/2013 | Kumar et al. |
| 8,601,569 B2 | 12/2013 | Segre et al. |
| 8,819,763 B1 | 8/2014 | Cheung et al. |
| 8,868,757 B1 | 10/2014 | Liu et al. |
| 9,112,911 B1 | 8/2015 | Karhade |
| 9,148,408 B1* | 9/2015 | Glazemakers ........ H04L 63/029 |
| 9,300,629 B1 | 3/2016 | Jahr |
| 9,363,282 B1* | 6/2016 | Yu ...................... H04L 63/1425 |
| 9,485,279 B2 | 11/2016 | Kimer et al. |
| 9,509,574 B2 | 11/2016 | Kimer et al. |
| 9,553,768 B2 | 1/2017 | Scott et al. |
| 9,560,015 B1* | 1/2017 | Glazemakers ...... H04L 63/0263 |
| 9,628,444 B1* | 4/2017 | Glazemakers ...... H04L 63/0236 |
| 9,853,947 B2 | 12/2017 | Glazemakers et al. |
| 9,866,519 B2 | 1/2018 | Glazemakers et al. |
| 9,906,497 B2 | 2/2018 | Glazemakers et al. |
| 9,992,185 B1 | 6/2018 | Basha et al. |
| 10,110,561 B2* | 10/2018 | Batke ..................... H04L 63/10 |
| 10,193,869 B2 | 1/2019 | Glazemakers et al. |
| 2002/0023210 A1 | 2/2002 | Tuomenoksa et al. |
| 2002/0026503 A1 | 2/2002 | Bendinelli et al. |
| 2002/0026531 A1 | 2/2002 | Keane et al. |
| 2002/0049914 A1 | 4/2002 | Inoue et al. |
| 2002/0053031 A1 | 5/2002 | Bendinelli et al. |
| 2002/0091859 A1 | 7/2002 | Tuomenoksa et al. |
| 2002/0093915 A1 | 7/2002 | Larson |
| 2002/0099937 A1 | 7/2002 | Tuomenoksa |
| 2003/0009693 A1 | 1/2003 | Brock et al. |
| 2003/0028805 A1 | 2/2003 | Lahteenmaki |
| 2003/0041091 A1 | 2/2003 | Cheline et al. |
| 2003/0041136 A1 | 2/2003 | Cheline et al. |
| 2003/0051169 A1 | 3/2003 | Sprigg et al. |
| 2003/0055990 A1 | 3/2003 | Cheline et al. |
| 2003/0055994 A1 | 3/2003 | Herrmann et al. |
| 2003/0131263 A1 | 7/2003 | Keane et al. |
| 2003/0145104 A1 | 7/2003 | Boden et al. |
| 2003/0145226 A1 | 7/2003 | Bruton, III et al. |
| 2003/0177389 A1 | 9/2003 | Albert et al. |
| 2003/0200321 A1 | 10/2003 | Chen et al. |
| 2003/0216143 A1 | 11/2003 | Roese et al. |
| 2003/0237004 A1 | 12/2003 | Okamura |
| 2004/0044910 A1 | 3/2004 | Ylipieti |
| 2004/0073666 A1 | 4/2004 | Foster et al. |
| 2004/0078573 A1 | 4/2004 | Matsuyama |
| 2004/0088542 A1 | 5/2004 | Daude et al. |
| 2004/0167984 A1 | 8/2004 | Herrmann |
| 2004/0268121 A1 | 12/2004 | Shelest et al. |
| 2004/0268142 A1 | 12/2004 | Karjala et al. |
| 2005/0088977 A1 | 4/2005 | Roch et al. |
| 2005/0165889 A1 | 7/2005 | Muret et al. |
| 2005/0198306 A1 | 9/2005 | Palojarvi et al. |
| 2005/0210067 A1 | 9/2005 | Nakatani et al. |
| 2005/0223095 A1 | 10/2005 | Volz et al. |
| 2005/0246767 A1 | 11/2005 | Fazal et al. |
| 2005/0273850 A1 | 12/2005 | Freund |
| 2005/0273853 A1 | 12/2005 | Oba et al. |
| 2006/0037072 A1 | 2/2006 | Rao et al. |
| 2006/0037075 A1 | 2/2006 | Frattura et al. |
| 2006/0041756 A1 | 2/2006 | Ashok et al. |
| 2006/0053296 A1 | 3/2006 | Busboom et al. |
| 2006/0059370 A1 | 3/2006 | Asnis et al. |
| 2006/0126645 A1 | 6/2006 | Devarapalli et al. |
| 2006/0143702 A1 | 6/2006 | Hisada et al. |
| 2006/0161965 A1 | 7/2006 | Shelest et al. |
| 2006/0174336 A1 | 8/2006 | Chen |
| 2006/0184998 A1 | 8/2006 | Smith et al. |
| 2006/0190987 A1 | 8/2006 | Ohta et al. |
| 2006/0248337 A1 | 11/2006 | Koodli |
| 2006/0259583 A1 | 11/2006 | Matsuura |
| 2007/0033425 A1 | 2/2007 | Clark |
| 2007/0074049 A1 | 3/2007 | Frenkel et al. |
| 2007/0101405 A1 | 5/2007 | Engle et al. |
| 2007/0209081 A1 | 9/2007 | Morris |
| 2007/0220602 A1 | 9/2007 | Ricks et al. |
| 2007/0299954 A1 | 12/2007 | Fatula |
| 2007/0300296 A1* | 12/2007 | Kudla ................. H04L 63/0263 726/13 |
| 2008/0004699 A1 | 1/2008 | Ben Nun |
| 2008/0028436 A1 | 1/2008 | Hannel et al. |
| 2008/0028445 A1 | 1/2008 | Dubuc et al. |
| 2008/0046995 A1 | 2/2008 | Satterlee et al. |
| 2008/0052775 A1 | 2/2008 | Sandhu et al. |
| 2008/0072312 A1 | 3/2008 | Takeyoshi et al. |
| 2008/0082640 A1 | 4/2008 | Chang et al. |
| 2008/0098472 A1 | 4/2008 | Enomoto et al. |
| 2008/0130897 A1 | 6/2008 | Donatelli et al. |
| 2008/0178278 A1 | 7/2008 | Grinstein et al. |
| 2008/0235755 A1 | 9/2008 | Blaisdell et al. |
| 2008/0301801 A1 | 12/2008 | Jothimani |
| 2009/0031415 A1 | 1/2009 | Aldridge et al. |
| 2009/0113540 A1 | 4/2009 | Chandwani |
| 2009/0119749 A1 | 5/2009 | Datla et al. |
| 2009/0249440 A1 | 10/2009 | Platt et al. |
| 2009/0254970 A1 | 10/2009 | Agarwal et al. |
| 2009/0300750 A1 | 12/2009 | Chou et al. |
| 2009/0328219 A1 | 12/2009 | Narayanaswamy |
| 2010/0037311 A1 | 2/2010 | He et al. |
| 2010/0071043 A1 | 3/2010 | Babula et al. |
| 2010/0175124 A1 | 7/2010 | Miranda |
| 2010/0205657 A1 | 8/2010 | Manring et al. |
| 2010/0306530 A1 | 12/2010 | Johnson et al. |
| 2011/0016509 A1 | 1/2011 | Huang et al. |
| 2011/0030045 A1 | 2/2011 | Beauregard et al. |
| 2011/0107411 A1 | 5/2011 | McClain et al. |
| 2011/0252230 A1 | 10/2011 | Segre et al. |
| 2011/0252459 A1 | 10/2011 | Walsh et al. |
| 2011/0282997 A1 | 11/2011 | Prince et al. |
| 2011/0307947 A1 | 12/2011 | Kariv et al. |
| 2012/0036233 A1 | 2/2012 | Scahill et al. |
| 2012/0078994 A1 | 3/2012 | Jackowski et al. |
| 2012/0124239 A1 | 5/2012 | Shribman et al. |
| 2012/0198535 A1 | 8/2012 | Oberheide et al. |
| 2012/0210002 A1 | 8/2012 | McQuade |
| 2012/0233712 A1 | 9/2012 | Falk et al. |
| 2012/0278878 A1 | 11/2012 | Barkie et al. |
| 2012/0324442 A1 | 12/2012 | Barde |
| 2013/0247142 A1 | 9/2013 | Nishizawa et al. |
| 2013/0268643 A1 | 10/2013 | Chang et al. |
| 2013/0332724 A1 | 12/2013 | Walters |
| 2014/0006347 A1* | 1/2014 | Qureshi ................. G06F 21/10 707/621 |

(56) References Cited

U.S. PATENT DOCUMENTS

| | | | |
|---|---|---|---|
| 2014/0109175 A1 | 4/2014 | Barton et al. | |
| 2014/0223541 A1 | 8/2014 | Yoon et al. | |
| 2014/0245423 A1* | 8/2014 | Lee | H04L 63/0218 726/12 |
| 2014/0282914 A1 | 9/2014 | Holmelin et al. | |
| 2014/0351413 A1 | 11/2014 | Smith et al. | |
| 2014/0359160 A1 | 12/2014 | Elhaddad et al. | |
| 2015/0009831 A1 | 1/2015 | Graf | |
| 2015/0135265 A1* | 5/2015 | Bagrin | H04L 63/02 726/1 |
| 2015/0212867 A1 | 7/2015 | Klee et al. | |
| 2015/0215207 A1 | 7/2015 | Qin et al. | |
| 2015/0244711 A1 | 8/2015 | Venkataraman et al. | |
| 2015/0293756 A1* | 10/2015 | Wright | G06F 11/3096 717/178 |
| 2015/0341443 A1 | 11/2015 | Shen et al. | |
| 2016/0099916 A1 | 4/2016 | Glazemakers et al. | |
| 2016/0099917 A1 | 4/2016 | Glazemakers et al. | |
| 2016/0112374 A1 | 4/2016 | Branca | |
| 2016/0219018 A1 | 7/2016 | Raman et al. | |
| 2017/0111310 A1 | 4/2017 | Glazemakers et al. | |
| 2017/0280270 A1* | 9/2017 | Kim | H04W 24/04 |
| 2017/0295140 A1 | 10/2017 | Glazemakers et al. | |
| 2017/0346811 A1 | 11/2017 | Newell et al. | |
| 2018/0069826 A1 | 3/2018 | Glazemakers et al. | |
| 2018/0139177 A1 | 5/2018 | Glazemakers et al. | |
| 2018/0183763 A1 | 6/2018 | Glazemakers et al. | |
| 2018/0309721 A1 | 10/2018 | Ashley et al. | |
| 2019/0124113 A1 | 4/2019 | Labana et al. | |

FOREIGN PATENT DOCUMENTS

| | | | |
|---|---|---|---|
| WO | 2006012612 | 2/2006 | |
| WO | 2006014842 | 2/2006 | |
| WO | 2010069058 | 6/2010 | |
| WO | WO-2016036391 A1 * | 3/2016 | H04L 12/22 |

OTHER PUBLICATIONS

AppGate 10.2.3 manual, 2004.
Internationa Patent Application PCT/US2016/036053, International Search Report and Written Opinion, dated Jun. 24, 2016.
International Patent Application PCT/US2015/050485 International Search Report and Written Opinion, dated Jan. 12, 2016.
International Patent Application PCT/US2015/063783 International Search Report and Written Opinion, dated Mar. 1, 2016.
International Patent Application PCT/US2016/036238, International Search Report and Written Opinion, dated Sep. 2, 2016.
Shen, Yan et al., A Multi-Tunnel VPN Concurrent System for New Generation Network Based on User Space, 2012 IEEE 11th International Conference on Trust, Security and Privacy in Computing and Communications, IEEE, 2012, pp. 1334-1341.
Wang, Song et al., A distributed object-based IPSec multi-tunnels concurrent architecture, 2011 International Conference on Computational Problem-Solving (ICCP), IEEE, 2011, pp. 471-476.
European Patent Application No. 15881395.6 extended European search report, dated Oct. 4, 2018, 8 pages.
Title: Systems and Methods for Protecting Network Devices, U.S. Appl. No. 14/578,140, filed Dec. 19, 2014, Inventor(s): Kurt Glazemakers, et al., U.S. Pat. No. 9,148,408, dated Sep. 29, 2015.
Title: Systems and Methods for Protecting Network Devices, U.S. Appl. No. 14/828,357, filed Aug. 17, 2015, Inventor(s): Kurt Glazemakers, et al., U.S. Pat. No. 9,853,947, dated Dec. 26, 2017.
Title: Systems and Methods for Protecting Network Devices by a Firewall, U.S. Appl. No. 15/853,178, filed Dec. 22, 2017, Inventor(s): Kurt Glazemakers, et al., Status: Final Rejection Mailed, dated Apr. 3, 2018.
Title: Systems and Methods for Protecting Network Devices by a Firewall, U.S. Appl. No. 16/207,566, filed Dec. 3, 2018, Inventor(s): Kurt Glazemakers, et al., Status: Docketed New Case—Ready for Examination, dated Jan. 11, 2019.
Title: Multi-tunneling Virtual Network Adapter, U.S. Appl. No. 14/630,550, filed Feb. 24, 2015, Inventor(s): Kurt Glazemakers, et al., U.S. Pat. No. 9,906,497, dated Feb. 27, 2018.
Title: Multi-tunneling Virtual Network Adapter, U.S. Appl. No. 15/902,912, filed Feb. 22, 2018, Inventor(s): Kurt Glazemakers, et al., Status: Docketed New Case—Ready for Examination, dated Oct. 16, 2018.
Title: Name Resolving in Segmented Networks, U.S. Appl. No. 15/289,764, filed Oct. 10, 2016, Inventor(s): Kurt Glazemakers, et al., U.S. APt. No. 9,866,519, dated Jan. 9, 2018.
Title: Name Resolving in Segmented Networks, U.S. Appl. No. 15/800,953, filed Nov. 1, 2017, Inventor(s): Kurt Glazemakers, et al., Status: Docketed New Case—Ready for Examination, dated Feb. 22, 2018.
Title: Protecting Network Devices by a Firewall, U.S. Appl. No. 15/053,422, filed Feb. 25, 2016, Inventor(s): Kurt Glazemakers, et al., U.S. Pat. No. 9,628,444, dated Apr. 18, 2017.
Title: Systems and Methods for Protecting Network Devices by a Firewall, U.S. Appl. No. 15/168,863, filed May 31, 2016, Inventor(s): Kurt Glazemakers, et al., U.S. Pat. No. 9,560,015, dated Jan. 31, 2017.
Title: Systems and Methods for Protecting Network Devices by a Firewall, U.S. Appl. No. 15/408,132, filed Jan. 17, 2017, Inventor(s): Kurt Glazemakers, et al., Status: Docketed New Case—Ready for Examination, dated Feb. 15, 2017.

* cited by examiner

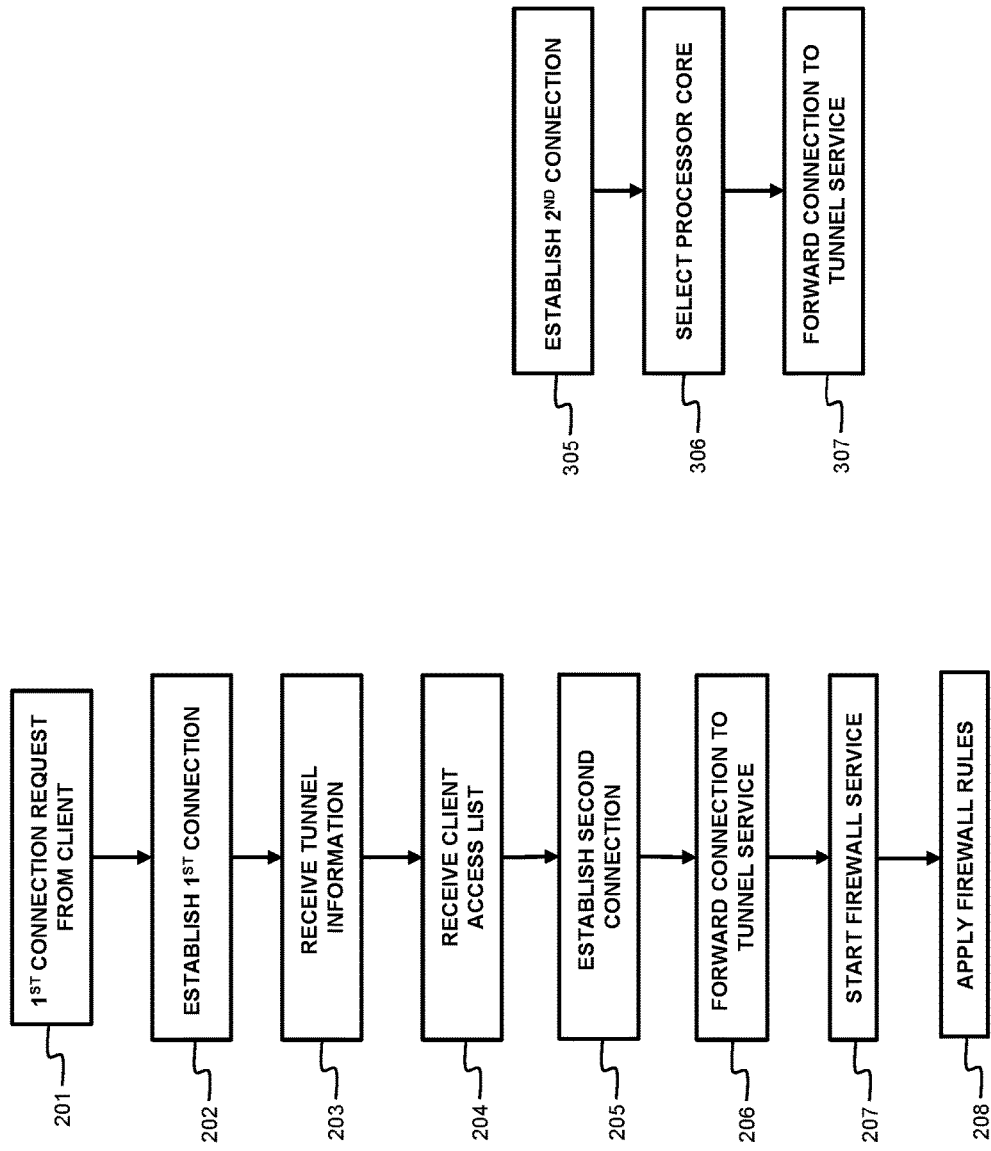

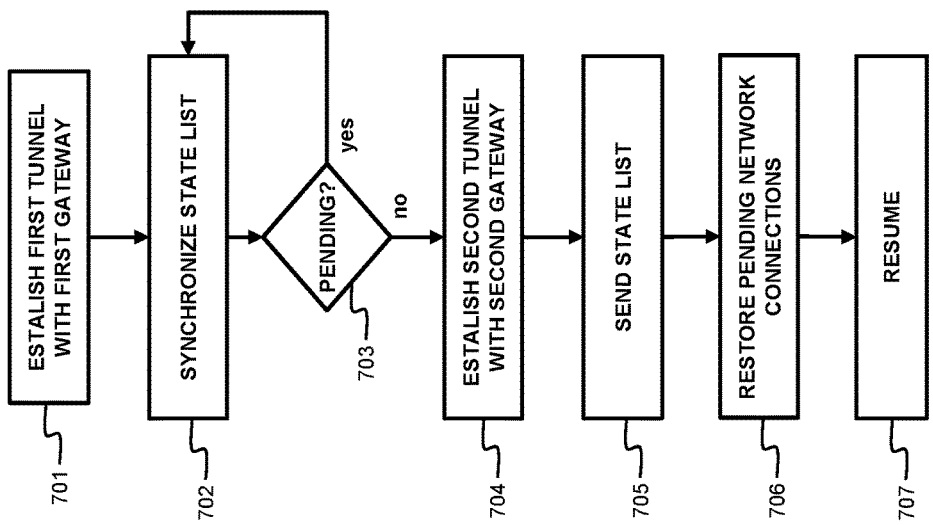

PROTECTING NETWORK DEVICES BY A FIREWALL

RELATED APPLICATIONS

This is a continuation-in-part application of U.S. patent application Ser. No. 15/053,422, entitled "PROTECTING NETWORK DEVICES BY A FIREWALL", filed Feb. 25, 2016, which claims the benefit of and priority to U.S. Provisional Application Ser. No. 62/292,702, filed Feb. 8, 2016, entitled "SYSTEMS AND METHODS FOR PROTECTING NETWORK DEVICES BY A FIREWALL," by Glazemakers et al., the entire contents of which applications are incorporated by reference as if fully set forth herein.

FIELD

At least some embodiments generally relate to the field of network protection and more particularly, but not limited to, the protection of private networks by a gateway including a tunnel server such as a VPN server and a firewall.

BACKGROUND

In order to protect private networks from unwanted network access, a firewall may be implemented in a gateway in order to selectively filter communication from and to the private network. By applying firewall rules, the firewall then lets network packets pass, or blocks them in one or both directions. The rules are typically defined by the source and/or destination addresses of the network packets, or the source and/or destination ports of the network packets.

A firewall may further perform stateful packet inspection thereby keeping track of the state of networking connections such as, for example, TCP or UDP networking connections. This way, a finer-grained control is possible as the rules become dependent on the network connection and thus dynamic. The firewall keeps track of all open network connections by maintaining a table, the state table or state list, with all the pending connections.

In order to have better control on the network traffic passing by a gateway, the firewall may further perform deep packet inspection by controlling the payload data of the networking packets. This way, different types of control can be implemented such as, for example, user access or authorization, protocol compliance, spam filtering and virus detection.

In order to protect a private network further, the gateway's firewall may be combined with network tunnelling. Access to the private network may then be established by a VPN (Virtual Private Network) where a secured networking tunnel is set up between a client device and the gateway. The setup of such a tunnel is only granted upon successful authentication with the gateway, which then functions as a VPN server. By the combination of a firewall and VPN server in the gateway, access to devices in the private network can be authorized on a client or a user level by the VPN server and on a network level by the firewall.

SUMMARY

Several problems may arise with combined gateway systems as described above. First, the amount of firewall rules will increase with each additional user, making the management of all the rules difficult for large systems. Because of this, each incoming packet will have to be processed against all of these rules.

A second problem relates to the failover of the gateway. In one failover scheme, referred to as passive failover, all the information in the gateway (i.e., firewall rules, state list and active networking tunnels) is constantly synchronized with a second redundant gateway. If there is a failure of the first gateway, the second gateway automatically takes over from the first gateway. Because of the synchronization, no active network connections are lost during failover.

In another failover scheme, referred to as active failover, several gateways are also synchronized with each other, but all are active at the same time such that the load can be balanced between the gateways. Also, in this case, because of the synchronization, one gateway can take over all connections from another gateway upon failure without losing the network connections.

A problem with the two schemes is scalability because the system cannot be scaled by just adding new gateways. First, the bandwidth between the gateways needed for synchronization will increase exponentially with the amount or number of gateways. Second, because the state list is kept synchronized, the size of the state list and firewall rules for each gateway will also increase linearly when scaling. Because of this, the needed bandwidth, processing power and memory space of each gateway will increase when adding a new gateway.

Various embodiments are described herein that alleviate the above problems and provide a gateway that can be scaled and managed in an easy and straightforward manner. Some embodiments are summarized in this section.

Embodiments of the present disclosure help protect network devices from unauthorized access. Among other things, embodiments of the disclosure allow full access to application servers and other network devices that a client is authorized to access, while preventing all access (or even knowledge) of network devices the client is not authorized to access.

A computer-implemented method according to one embodiment of the present disclosure includes: upon a request from a client device, establishing, by a computer system implementing a gateway to a private network, a network tunnel between the client device and the gateway; and, upon establishing the network tunnel, starting a separate firewall service with a separate set of firewall rules on the computer system for selectively blocking and allowing network traffic between the client device and one or more network devices in the private network.

The present disclosure includes various methods, apparatuses (including computer systems) that perform such methods, and computer readable media containing instructions that, when executed by computing systems, cause the computing systems to perform such methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 2 is an exemplary process for establishing a networking tunnel between a client device and a private network that may be executed by components of the present disclosure.

FIG. 3 is an exemplary process for distributing firewall services among different processor cores of a computing system implementing a gateway according to one embodiment.

FIG. 7 is an exemplary process for seamlessly transferring a firewall service from one gateway to another gateway executed by components of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 1:
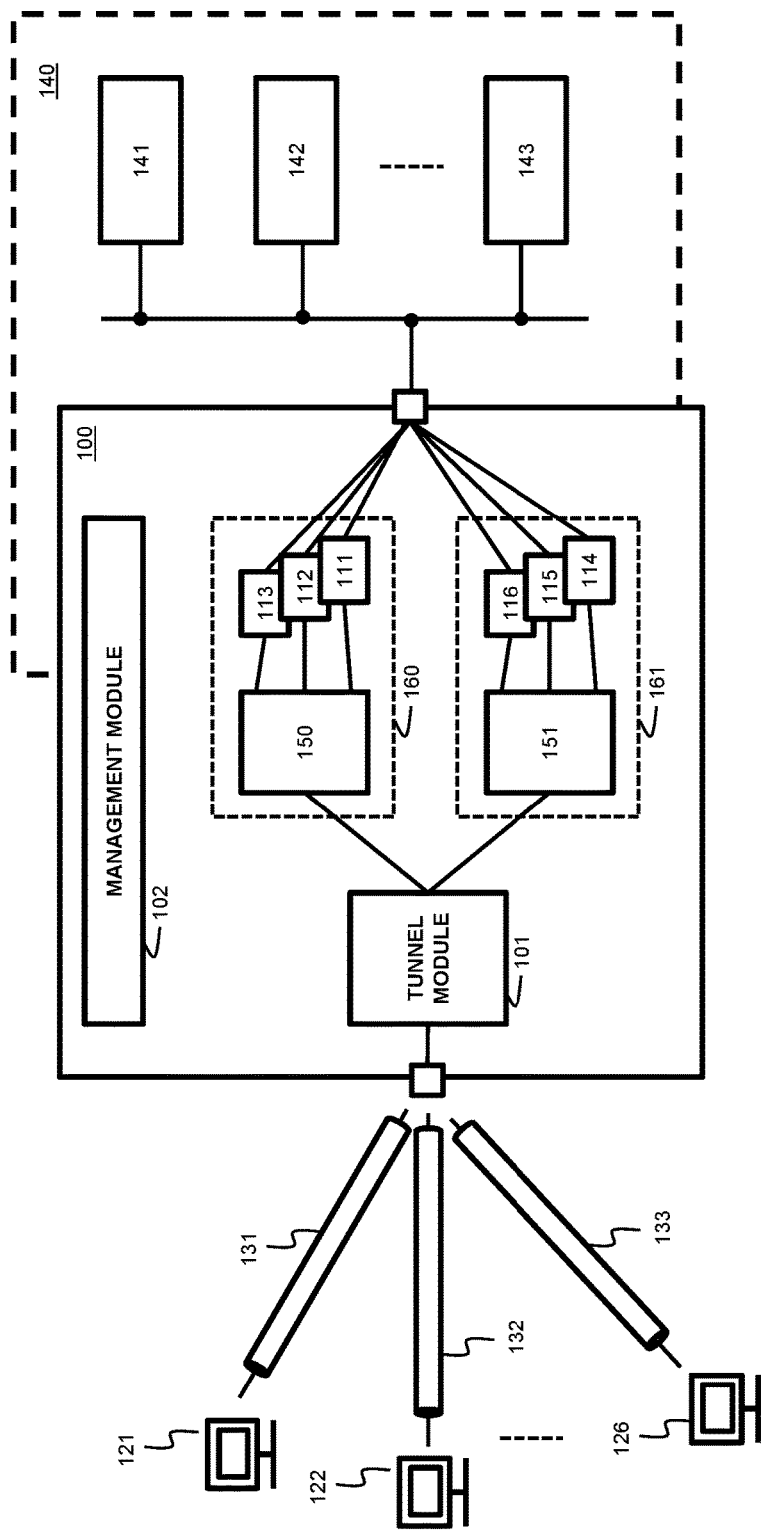
FIG. 1 is an exemplary system for the protection of network devices from unwanted network access according to various aspects of the present disclosure.

FIG. 1 illustrates an exemplary system for the protection of network devices from unwanted network access according to various aspects of the present disclosure. In this example, three network devices (application servers 141, 142 and 143) are part of a private network 140. Access to the servers 141-143 is obtained from within the private network 140 via a private network address. In this context, the term "private" refers to the fact that the application servers 141-143 are not globally routable. In other words, the application servers 141-143 cannot be addressed by their private network address from outside the private network 140.

The private network 140 and other components in FIG. 1 may utilize any number and type of communication protocols, also referred to as the Internet Protocol ("IP"), or as the Transmission Control Protocol/Internet Protocol ("TCP/IP"). For example, the private network 140 may have address ranges as set by RFC 1918 for Internet Protocol Version 4 or IPv4 and RFC 4193 for Internet Protocol Version 6 or IPv6.

Network devices 141-143 may correspond to application servers that provide services over the network 140 to other computing devices. Any number and type of application servers and associated services may be used in conjunction with embodiments of the present disclosure, such as mail servers, file servers, Customer Relationship Management or CRM services, Enterprise Resource Planning or ERP services, and/or document management services.

A data connection may then be established with any of application servers 141-143 by opening a communication socket with the respective application server on a port (or port range) associated with the service. Application servers 141-143 may correspond to physical devices with a physical networking interface associated with a private network address. Alternatively, application servers 141-143 may also correspond to virtual server instances running on one or more physical servers. Virtual server instances may each have a virtual network interface with an associated private network address. Virtual server instances may include, as well as operate in conjunction with, one or more user space instances (also known as software containers, virtual engines, virtual private servers, and/or jails). Such user space instances may be implemented in any suitable manner, including, for example, via the DOCKER software tool.

In the example shown in FIG. 1, the private network 140 is separated from an external network by a gateway 100, thereby allowing networking traffic between the external network and the private network 140 in a controlled way. The system of FIG. 1 can identify clients 121-126 as "trusted clients" having access rights to one or more of the application servers 141-143 within the private network 140 in order to use the services running thereon. The clients 121-126 may be, or include, physical hardware and/or virtual components. For example, a client 121-126 may include a virtual operating system running on a physical device, such as a mobile device. The system can also grant network access to a selection of the application servers 141-143 which the clients 121-126 are allowed to access, and deny network access to any application server the clients 121-126 are not allowed to access.

In order to control access by the clients 121-126 to the application servers 141-143, networking tunnels 131-133 are established between the clients 121-126 and the gateway 100. This way, the private network 140 is extended to the clients 121-126. In some embodiments, a virtual private network (or "VPN") is established through tunnels 131-133. In this manner, a client 121-126, although not physically in the private network 140, is provided a private network address in the range of the private network 140, and can thus potentially access all application servers 141-143 by their respective private network address (provided access is allowed, as is discussed in more detail below).

All initial network connection requests from clients 121-126 are handled by tunnel module 101 implemented in gateway 100. In one embodiment, tunnel module 101 looks at the initial connection (e.g., typically a first TLS packet that is arriving) and then determines whether to handover the connection to management module 102 (discussed below) in the case of metadata, or to one of tunnel services 150, 151 (discussed below) in the case of the actual tunnel traffic (i.e., data) from the clients. Once the connection is handed over (e.g., this can be done by passing over a file descriptor to management module 102 or one of the tunnel service modules), tunnel module 101 is not involved anymore. Then, the connection goes directly from the client to management module 102, or to the selected tunnel service 150, 151.

The initial network connection request may be a connection request for establishing a new tunnel by a new client device or a new network connection request within an existing tunnel. The data travelling over the connections in the tunnels 131-133 may further be protected by encryption, such as according to the Internet Protocol Security (or "IPsec protocol,") Transport Layer Security (or "TLS") and/or Datagram Transport Layer Security (or "DTLS"). In an example, the tunnel module 101 operates according to TLS or SSL and sets up the networking connections as TCP network connections. In order to do so, the clients send the request to an open port or port range of the gateway 100, preferably the standard port 443 for TLS/SSL encrypted TCP connections.

Gateway 100 further implements firewall services 111-116. Each respective firewall service then implements a firewall for selectively blocking and allowing network traffic between the respective client device and the network devices 141-143 in the private network. Each firewall service also comprises a set of firewall rules defining the access rules for a respective client device. In other words, gateway 100 runs a separate firewall for each connected client 121-126. An advantage of this is that the size of the firewall rules of a firewall service does not grow with the amount of connected clients. This way, an increase in connected clients does not result in a performance loss due to an increase in the amount of firewall rules that have to be managed by a single firewall service.

FIG. 2 shows an exemplary process that may be executed by components of the present disclosure including the gateway 100 according to FIG. 1. By this process, a client device 121-126 is connected to the private network 140 through the gateway 100. As an example, the process will be described with reference to client device 121. In a first step 201, the tunnel module 101 receives a first connection request from client network device 121 to establish a first network connection with the gateway 100, for example a secured TCP network connection request received on port 443 of the gateway. Thereupon, the network connection is established under step 202, for example, by a three-way handshake in the case of a TCP network connection. This first network connection is used to exchange control information between the client 121 and the gateway 100, and more particularly with the management module 102 implemented in the gateway 100. In order to know that the connection is for control purposes, the tunnel module may inspect the first data packet exchanged over each newly-established network connection. If the data packet is a control data packet, the tunnel module 101 identifies the network connection as a control connection and will redirect all further packets received over this connection to the management module 102. The control data packet may, for example, be identified by inspecting a specific TSL extension field in the header of the TLS packet.

In the next step 203, the management module 102 receives tunnel information from the client device 121 over the first network connection. This information is further referred to as the client tunnel list. This client tunnel list includes information in order to establish the networking tunnel 131 with the gateway such as, for example, authentication information for authenticating the client with the gateway. After successful authentication by the management module 102, the process proceeds to step 204.

In step 204, the management module 102 receives a client access list from client 121. This client access list comprises a listing of the network devices or applications in the private network 140 that the client device is allowed to access. The listing may, for example, comprise a network address such as an IPv4 or IPv6 network address identifying the respective network device in the private network 140. Also, a port number or port number range may be specified in order to limit the access to the respective network device to one or more specific applications. The listing may also identify the respective network device by its host name or by a fully qualified domain name (FQDN). The listing may also identify the respective network device indirectly by specifying a further service from where one or more respective network devices may be received. Such a service may, for example, be the Amazon Web Services which enables retrieval of a list of network devices using the AWS REST API according to metadata assigned to virtual instances in the Amazon cloud.

The client 121 may further retrieve this client access list and/or tunnel list from an authentication service that manages the client access to private network 140. In order to avoid a situation in which the client compromises the client access list and/or tunnel list, the lists may be made unalterable (i.e., protected such that an alteration of one or both of the lists may be detected by the management module 102).

Various methods and systems for authenticating the client and providing a client and tunnel list are further disclosed in U.S. Pat. No. 9,148,408 B1, which is hereby incorporated by reference in its entirety.

Then, in step 205, the tunnel module 101 establishes a second network connection with the client 121 upon request of the client 121. As this is a new connection, the tunnel module 101 inspects the first data packet received over this second connection. This second connection is used for the actual networking tunnel 131 because the client 121 has already established the first connection for the exchange of control information with the gateway 100. The inspected data packet is therefore identified as a first packet for the not yet established networking tunnel 131.

More specifically, in one embodiment, two connections are required for each tunnel (131,132,133) (e.g., two TCP connections in the case of a TLS tunnel). One connection is for uploading the tokens (metadata), and the other connection is for the actual tunnel traffic. The tunnel 131 is only established after step 207 (see below), and is only allowing traffic after step 208 (see below), because the firewall is blocked by default.

Thereupon, in step 206, the tunnel module 101 passes the second network connection (the connection that is responsible for tunnelling the traffic coming from the client 121) to tunnel service 150. Tunnel services 150 and 151 handle the tunnel traffic (131,132,133). Tunnel services 150, 151 are responsible to decrypt/encrypt the traffic coming and going to the respective client (121, 122, . . . 126) implemented on the gateway 100. The tunnel service then verifies with the management module 102 whether the networking tunnel 131 can be established. In the following step 207, the tunnel service 150 establishes the networking tunnel 131 by starting the firewall service 111. From this moment on, all data exchanged over the second network connection and thus over the networking tunnel 131 passes through firewall service 111. In other words, payload data from the networking tunnel 131 is forwarded to the started firewall service 111. This firewall service 111 implements a firewall that blocks by default all traffic between the client 121 and private network 140. In the next step 208, firewall service 111 applies the appropriate firewall rules to the firewall by retrieving the firewall rules from the management module 102. The management module 102 on its turn derives these firewall rules from the client access list.

More specifically, in one embodiment, the access rules are basically descriptive firewall rules, and the management module 102 fills in some of these descriptions. Some examples are as follows:

Allow TCP traffic to 1.1.1.1 port 80 (note that this is an access rule that is an exact match with a firewall rule).
Allow TCP traffic to www.google.com port 80 (note that this is an access rule that requires translation to multiple FW rules such as:
   Allow TCP traffic to 173.194.71.103 port 80
   Allow TCP traffic to 173.194.71.105 port 80
   Allow TCP traffic to 173.194.71.99 port 80
   ...)

Thus, one access rule can, for example, result in many firewall rules. In some cases, an access rule can be a call to an IAAS provider like AWS web services and allow TCP traffic to, for example the following: [all instances that have "finance" or another predetermined text string in their description].

In one embodiment, all TCP traffic is allowed to AWS:// tag:SSH=Engineering. This means that port 22 will be allowed to all instances that contain the tag <SSH,Engineering> inside an AWS environment. The management module will contact the API and retrieve a list of IP addresses and ports, and then translate these retrieved addresses and ports into access rules like:
   Allow TCP traffic to 10.0.0.1 port 22
   Allow TCP traffic to 10.0.0.15 port 22

By the process according to FIG. 2, a network tunnel 131 between the client device 121 and the gateway 100 is thus established together with a separate firewall with a separate set of firewall rules for selectively blocking and allowing network traffic between the client device 121 and the network devices 141-143 in the private network 140. This process is performed for every client 121-126 that connects to the private network 140 thereby obtaining the respective firewall services 111-116.

In another embodiment, a scriptable client access list is used in which a destination firewall rule of the client access list is a script (e.g., JavaScript) that will be executed when the client 121 deploys the tunnel 131. The script can query any remote third-party system (e.g., a customer ticketing system) to retrieve a list of destinations (e.g., IP addresses and ports) that are added to the client access list. New firewall rules are derived using these retrieved destinations.

In one embodiment, built-in functions like aws:// azure:// gce:// and vmware:// make use of the cloud API's (e.g., Amazon cloud API's) to resolve a list of IP addresses or ports. In another embodiment, this is extended by using a new descriptive destination field called script://. This allows creation of a script (e.g., JavaScript) (embedded in an entitlement token), which gets executed on the gateway. The script can query external third-party systems like a ticketing system, making use of the built-in claims like claims.user.username and the third-party REST API to retrieve a list of destinations (e.g., IP, hostname or any of the other destinations described above) for which this specific user has open tickets. In one embodiment, the list may also be a list of DNS names or a list of aws:// descriptive destinations, which will be resolved first and translated into a standard IP access list.

In one embodiment, there is logic to query a REST API, but it is limited to the syntax and items that are programmed in the system. The following are examples:
AWS://tag:SSH=Engineering
azure://network-security-group: Finance
The first example above resolves all the IP's of AWS instances with tag engineering and allows only TCP 22. The second example retrieves the list of all Azure instances that have a network security group called "finance" attached.

In one embodiment, the above querying is extended to use a script (e.g., script://). With the script, a user can write Javascript to query any remote system. As long as the remote system gives back a list of any of the built-in descriptive entitlements, the gateway will be able to create a list of IP access rules out of it and will update the firewall rules for this current session. So, for example, a ticketing system can be queried, and pass the username for an active session to the REST API, and the script will return a list of hostnames for all computers for which this user (or group, for example) has an open ticket. When the entitlement token (or attached condition) expires that contains the script, the entitlement script will re-run and will update the IP access rules. The ticketing system can also revoke the entitlement token by making a REST API call to the central authentication server (controller), and the user access rules will be updated in real-time based on the current state of open tickets.

The ticketing tool above is a non-limiting example. In other embodiments, any third-party tool can be used. This includes, for example, a tool that implements an approval process if a user requests access to a certain application (e.g., app). Only after management approval is given, then that app is allowed. The script can then retrieve the list of apps and will automatically adapt the IP access rules.

According to a further embodiment, the gateway 100 is implemented on a computer system comprising multiple processor cores. Management module 102, tunnel module 101, tunnel service 150 and firewall services 111, 112 and 113 may then be implemented on the computer system by computer-executable instructions executed on the processor cores. The gateway 100 then includes a separate tunnel service running on each processor core. This is illustrated by the exemplary embodiment of FIG. 1 where tunnel service 150 and firewall services 111, 112 and 113 are implemented on the first processor core 160 and tunnel service 151 and firewall services 114, 115 and 116 are implemented on a second processor core 161. Tunnel services 150 and 151 may, for example, be implemented as software processes running on the respective processor cores. The firewall services may be implemented as software threads run by the respective software process (i.e., the respective tunnel services).

An advantage of running separate tunnel services on each processor core is that inter-process communication between the firewall services and communication between a firewall service and the tunnel service is limited to the same core. As a result, when the gateway 100 scales up by adding more processor cores, there will be no loss in performance due to increased inter-process communication.

FIG. 3 shows an exemplary process that may be executed by components of the present disclosure including the gateway 100 according to FIG. 1. By the process, the client connections and, thus, the networking tunnels may be distributed over the different cores 160, 161. The process starts upon establishment of the second connection in step 305 as set out above with reference to step 205 of FIG. 2. The process then proceeds to step 306 where the tunnel module selects one of the tunnel services 150, 151 to which it will forward the second connection. This may be done in several ways. For example, the tunnel module may distribute the connection in a round-robin way by forwarding the connection each time to the next processor core. Alternatively, it may forward the connection to the processor which has the most resources available such as, for example, processing power, memory or any combination thereof. When the processor core is selected, the tunnel module 101 forwards the second connection to the selected tunnel service under step 307, as also set out above with reference to step 206 of FIG. 2.

Figure 4:
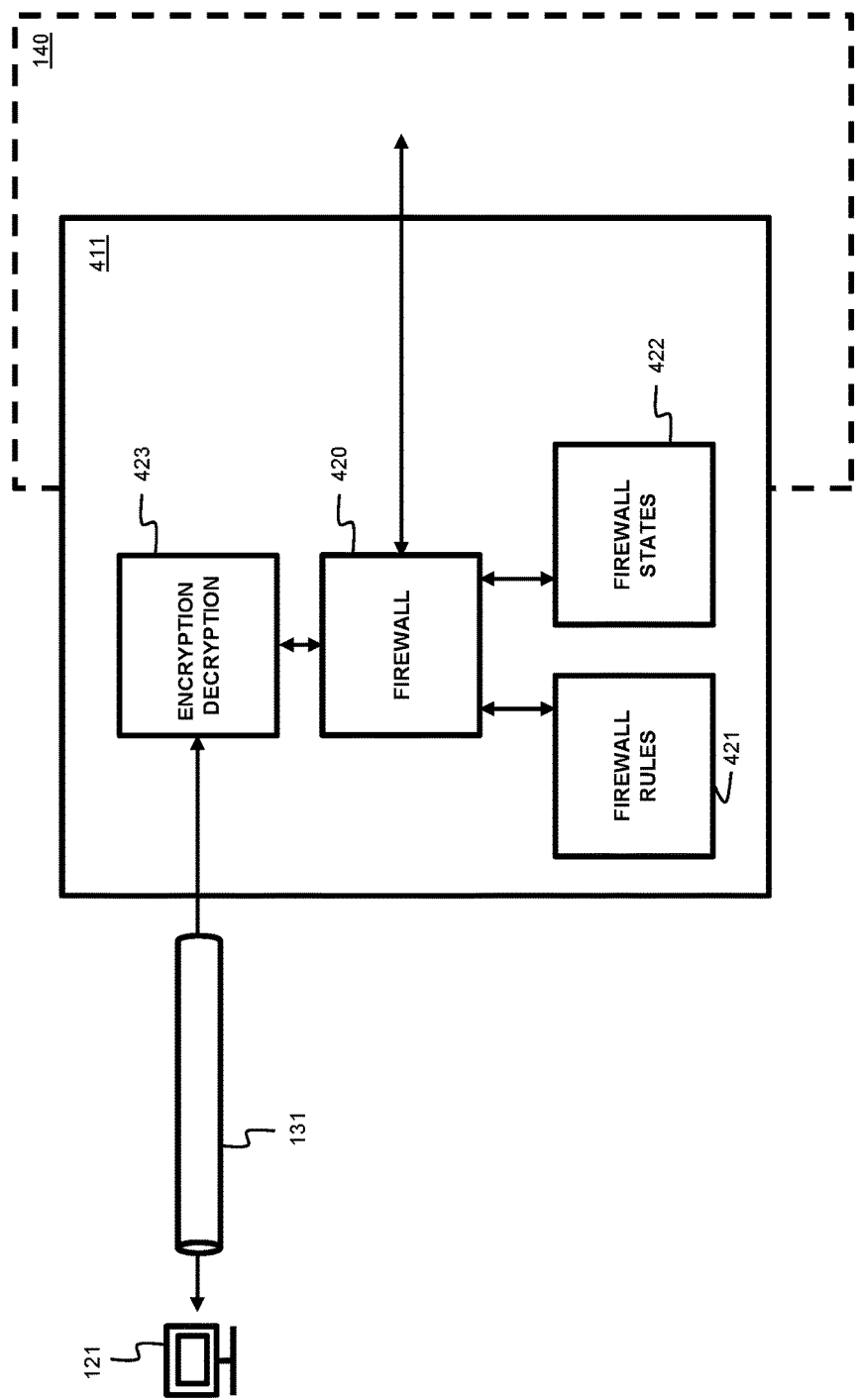
FIG. 4 is an exemplary system for the establishment of a networking tunnel between a client device and a private network separated by a gateway implementing a firewall service according to one embodiment.

FIG. 4 illustrates details of an exemplary firewall service 411 that may be implemented in a gateway 100 according to the present disclosure, for example as the firewall service 111 to 116 of FIG. 1. For the sake of exemplary illustration, it will be assumed that firewall service 411 corresponds to firewall service 111, which provides the networking tunnel 131 between client 121 and private network 140. When firewall service 411 is started, it comprises a firewall component 420 for selectively blocking and allowing network traffic between the respective client device 121 and the network devices 141-143 in the private network 140. The rules used by the firewall 420 according to which the traffic is blocked or allowed are stored as firewall rules 421. These rules may, for example, be stored in a file or database residing in memory of the computing system implementing the gateway 100.

Firewall 420 may be a stateful firewall configured to perform stateful packet inspection, thereby keeping track of the state of networking connections established over the networking tunnel 131 between client 121 and network devices 141-143 in private network 140. Each such connection may relate to TCP or UDP networking connections. This way, a finer-grained control is possible as the rules become dependent on the network connection and are thus dynamic. The firewall keeps track of all open network connections by maintaining a list, the state list 422, with all the pending connections. These states may, for example, be stored in a file or database residing in memory of the computing system implementing the gateway 100.

Each firewall service 411 thus maintains a separate state list 422. An advantage of this is that the size of the state list of the firewall service 411 does not grow with the amount of clients connected to the gateway 100. This way, an increase in connected clients does not result in a performance loss due to an increase in the amount of states that have to be managed by a single firewall service.

Firewall service 411 may further include an encryption and/or decryption component 423 for respectively encrypting and decrypting data transmitted to or received from the client 121. Encryption and decryption may further be performed according to the Internet Protocol Security (or "IPsec protocol,") Transport Layer Security (or "TLS") and/or Datagram Transport Layer Security (or "DTLS"). Encrypting and decrypting may further be hardware accelerated by a hardware component in the processor core on which the firewall service 411 is running.

Figure 5:
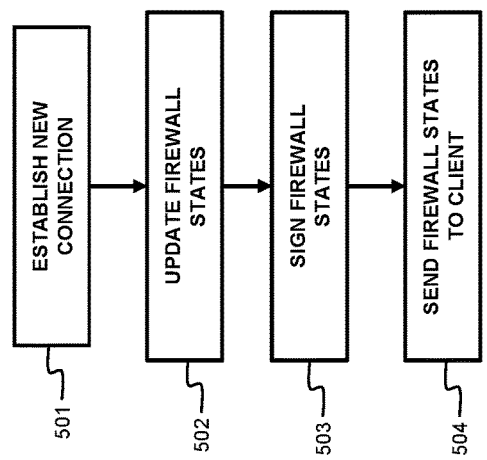
FIG. 5 is an exemplary process for synchronizing a firewall implemented on a gateway that may be executed by components of the present disclosure.

FIG. 5 shows an exemplary process that may be executed by components of the present disclosure, for example by the firewall service 411 of FIG. 4. By this process, a backup of the firewall service is made such that it can be used during a failure of the computer system, and thus the gateway on which the firewall service 411 is running. In step 501, firewall 420 allows the establishment of a network connection between client 121 and a network device or networking application in the private network 140. This network connection is thus established over the already-established networking tunnel 131. In order to keep track of the traffic over this new connection and, thus, to allow traffic of this connection to pass the firewall 420, the firewall registers the connection with the firewall state list 422 under step 501. Then, in step 502, the firewall 420 copies the state list 422 and signs the copy in step 503 with a secret signature key. This way it can later be verified that the copy was not altered by an unauthorized party. In step 504, the copy is then transmitted to the client 121. This way, the state list and thus the state of the firewall 420 is synchronized with the client 121. As the state list is signed under step 502, modifications to the state list can be discovered by checking the signature.

By the process of FIG. 5, a separate backup can be made of each firewall in the gateway 100. This has several advantages. First of all, this can be done quickly as only a limited set of states need to be transmitted each time. As a result, when the system is scaled, the time for synchronization of a single firewall service 411 does not increase. Second, this allows for a fail-over arrangement which is scalable as will be demonstrated below.

Figure 6:
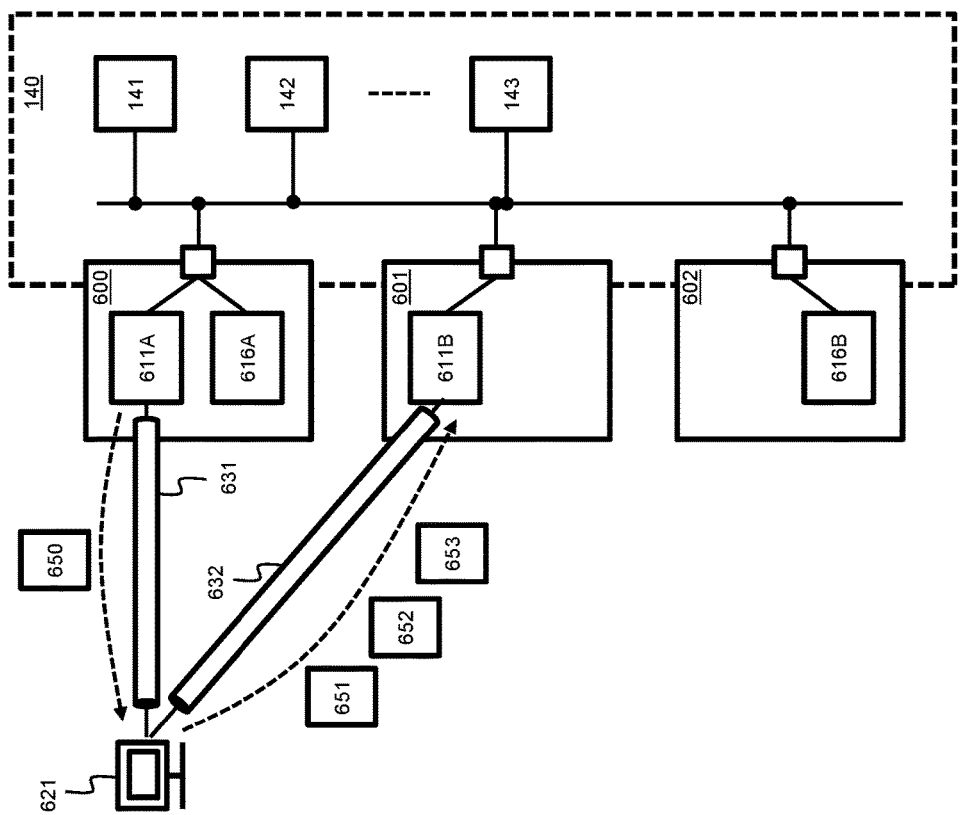
FIG. 6 is an exemplary system including a plurality of gateways for the protection of network devices from unwanted network access according to various aspects of the present disclosure.

FIG. 6 illustrates a system according to one embodiment for protecting access to a private network 140. Access is controlled by gateways 600, 601 and 602 corresponding to gateway 100 by also implementing tunnel module 101 (not shown), management module 102 (not shown), and one or more tunnel services 150, 151 (not shown) each implementing one or more firewall services. For sake of clarity, only two firewall services 611A and 616A are shown in gateway 600.

FIG. 7 shows an exemplary process that may be executed by the components of FIG. 6 in the case of a failure of one of the gateways 600-602 (in the following example, a failure of gateway 600 is discussed). In step 701 of the process, gateway 600 establishes a first networking tunnel 631 with client device 621 in order to provide the client 621 access to network devices 141-143 in the private network. By this, the firewall service 611A is started thereby implementing a stateful firewall and further including the firewall rules and state list. Step 701 may, for example, be performed in accordance with FIG. 2.

After establishment of the networking tunnel 631, firewall service 611A continuously synchronizes the state list with the client 621 by regularly sending a copy or update 650 of the state list to the client device 621. For example, the state only needs to be synced if the actual state is changed. Thus, if the client does not open new connections to the protected servers, no state synchronization will occur. Also, this synchronization is configurable and can be done, for example, continuously, or at least every 1-5 seconds, etc. As long as the networking tunnel is in place 631, the synchronization is active as illustrated by the loop 703-702. The synchronization of the state list may further be performed according to the process as illustrated in FIG. 5.

For purposes of exemplary discussion, consider that at a certain moment in time, the networking tunnel 631 is interrupted. As a result of this interruption, the process proceeds to step 704. The interruption of the networking tunnel 631 may be caused by several factors such as, for example, by a failure in the networking path between the client 621 and the gateway 600, or by a failure of the gateway 600 itself. When the client detects the failure of the networking tunnel, it establishes a new networking tunnel 632 with second gateway 601, which also provides access to private network 140. This may, for example, be done by the process as illustrated by FIG. 2 by forwarding the tunnel authentication information 653 and client access list 652 to the second gateway 601.

More specifically, in one embodiment, the information about all of the available gateways (600, 601, 602) is part of the tunnel lists described above. This information may come from, for example, a central authentication server (controller) such as described in U.S. Pat. No. 9,148,408 B1, which was incorporated by reference above. This information is available at the first connection (i.e., before the first connection may fail). The central authentication server simply picks another candidate from the tunnel list and establishes the connection. The only source information coming from copy or update 650 is the actual connection state from the firewall service that will be synced once the new tunnel is established.

Upon establishment of the tunnel 632, the firewall service 611B is started on gateway 601 with identical firewall rules as used in firewall service 611A because the same access list 652 was used by the management module of gateway 601 to derive the firewall rules.

Upon establishment of the second network tunnel 632, the client 621 also transmits the state list 651 to the gateway 601 under step 705 of the process. In one embodiment, the copy or update 650 is the source of state list 651. The connections were going to tunnel 631 before the failover. During the active connections, the state has been continuously synced to client 621, and also updated when the states are updated for firewall service 611A. When the tunnel is dropped, a new tunnel is established and the latest received state 651 is synched to firewall service 611B.

The state list 651 may, for example, be forwarded to the management module. The management module checks that the state list was not changed by the client, and then provides the state list to the firewall service 611B that uses it as its state list in order restore the state of the firewall under step 706. After restoring the state of the firewall, the client resumes, under step 707, its communication with the private network 140, thereby achieving a continuous fail-over (i.e., without a loss of the pending network connections established over the initial networking tunnel 631).

Alternatively, the state list may also be sent over the networking tunnel directly to the firewall service 611B, wherein this service will check that the state list was not altered. This checking may be done by using the same (shared) secret signature key between the gateways. In one embodiment, because the firewall states are temporarily stored in memory on the client, there is a potential risk of unauthorized tampering with the states. In order to avoid this risk, the states are signed with a secret shared key between the gateways. So, if the states are tampered with, the signature is broken and the states will not be accepted.

The process of FIG. 7 has the advantage that no synchronization of firewall rules and states between the gateways 600 and 601 is needed. Therefore, the system can be easily scaled by adding a gateway (e.g., gateway 602) without bandwidth requirements between the gateways (note that there remains no requirements for any bandwidth to be utilized between the gateways). Furthermore, upon failure of gateway 600, the networking tunnels can be transferred across the gateways 601 and 602. For example, the firewall service 616A may be moved to gateway 602 as service 616B while firewall 616A is transferred to gateway 601 as service 611B.

Figure 8:
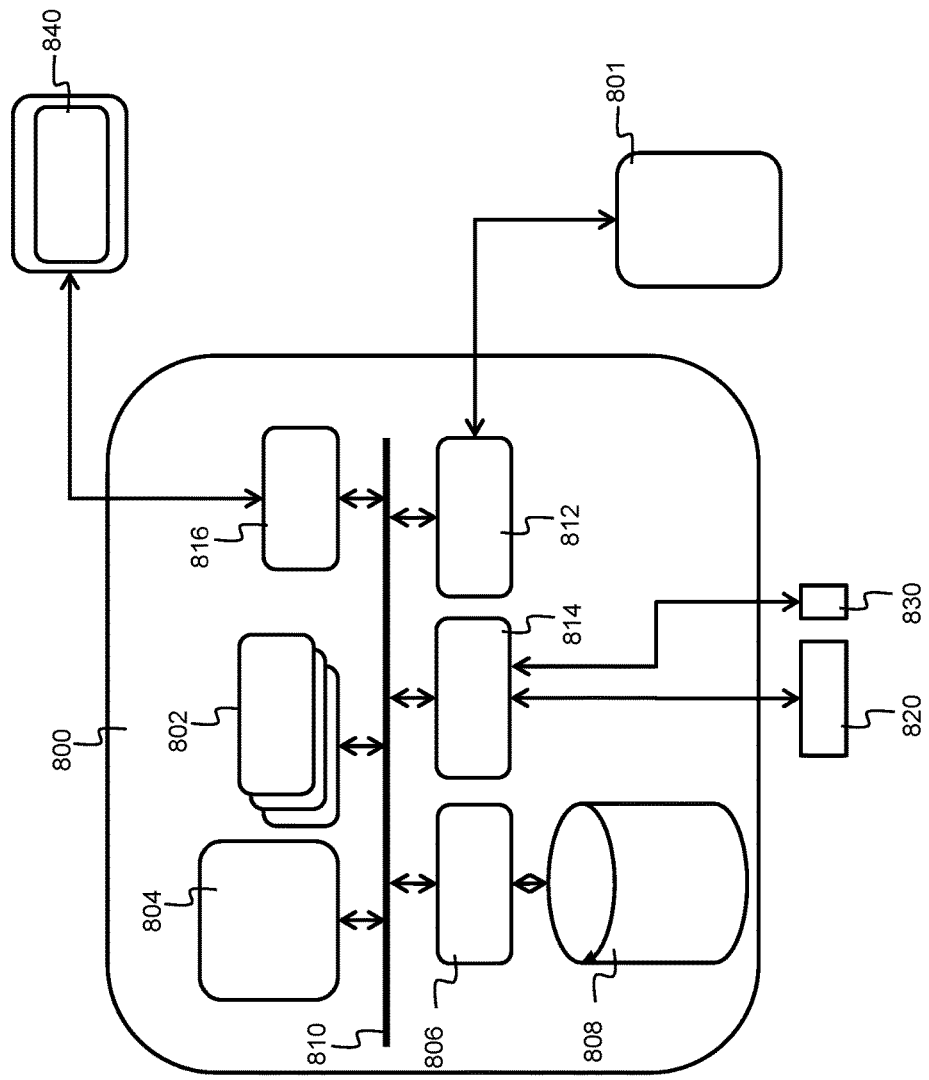
FIG. 8 illustrates an exemplary computing system according to various aspects of the present disclosure.

FIG. 8 shows a suitable exemplary computing system 800 for implementing the gateway according to the above embodiments. Computing system 800 may in general be formed as a suitable general purpose computer and comprise a bus 810, one or more processor cores 802, a local memory 804, one or more optional input interfaces 814, one or more optional output interfaces 816, one or more communication interfaces 812, a storage element interface 806 and one or more storage elements 808. Bus 810 may comprise one or more conductors that permit communication among the components of the computing system 800. Processor cores 802 may include any type of conventional processor or microprocessor that interprets and executes programming instructions. Local memory 804 may include a random access memory (RAM) or another type of dynamic storage device that stores information and instructions for execution by processor cores 802 and/or a read only memory (ROM) or another type of static storage device that stores static information and instructions for use by processor 802. Input interface 814 may comprise one or more conventional mechanisms that permit an operator to input information to the computing device 800, such as a keyboard 820, a mouse 830, a pen, voice recognition and/or biometric mechanisms, etc. Output interface 816 may comprise one or more conventional mechanisms that output information to the operator, such as a display 840. Communication interface 812 may comprise any transceiver-like mechanism such as, for example, one or more Ethernet interfaces that enables computing system 800 to communicate with other devices and/or systems 801. The communication interface 812 of computing system 800 may be connected to such another computing system by means of a local area network (LAN) or a wide area network (WAN) such as, for example, the internet. Storage element interface 806 may comprise a storage interface such as, for example, a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage elements 808 above are described as, for example, a local disk, in general any other suitable computer-readable media such as a removable magnetic disk, optical storage media such as a CD-ROM or DVD-ROM disks, solid state drives, flash memory cards, etc., could be used. The system 800 described above may also run as a virtual machine above the physical hardware.

Steps performed according to the above processes may be implemented as computer-executable instructions. These instructions may then be executed on processor cores 802 upon performing the processes. This way, steps executed by tunnel module 101, management module 102, tunnel services 150, 151 and firewall services 111-116 may, for example, be implemented as instructions on computing system 800 thereby implementing gateway 100. Processor cores 802 may correspond to processor cores 160, 161 of gateway 100. A tunnel service 150, 151 is then run on each of the processor cores 802. Each processor core 802 then runs separate firewall services respectively started by one of the tunnel services. Data packet communication between client devices 121-126 and the gateway 100 may be performed over a networking interface 812. Also, data packets communicated between gateway 100 and private network 140 may be exchanged over a networking interface 812. The computer-executable instructions may form or be part of a computer program product that is stored on storage element 808 or any computer readable storage medium.

Communication among systems, devices, and components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunnelling protocol (e.g. IPsec, SSH), or any number of existing or future protocols.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system.

Various functionality may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, Opera, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signalling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

The invention claimed is:

1. A computer-implemented method, comprising:
   receiving, by a first computer system implementing a first gateway to a private network, a connection request from a client device, wherein the private network comprises one or more network devices;
   after receiving the connection request, receiving, by the first computer system, a client access list indicating those of the network devices in the private network that are allowed to communicate with the client device;
   starting, on the first computer system, a firewall service for a first network tunnel between the client device and the first gateway;
   deriving, by the first computer system, a set of firewall rules from the client access list; and
   applying, by the firewall service, the set of firewall rules to selectively block and allow network traffic between the client device and the one or more network devices in the private network.

2. The method of claim 1, wherein the client access list comprises a script, and the method further comprises executing, by the first computer system, the script to obtain a list of IP addresses, and updating the set of firewall rules based on the obtained list of IP addresses.

3. The method of claim 1, wherein the client access list comprises a script, and the method further comprises:
   after starting the firewall service, executing the script to retrieve IP addresses or ports;
   adding the retrieved IP addresses or ports to the client access list;
   after adding the obtained IP addresses or ports to the client access list, deriving, using the client access list, one or more new firewall rules; and
   applying, by the firewall service, the new firewall rules for the first network tunnel.

4. The method of claim 3, wherein the script queries a second computer system to retrieve the IP addresses or ports.

5. The method of claim 4, wherein the script is Javascript, the script is further configured to make a connection, using a REST API or a database query, to the second computer system to retrieve a list of destinations, and the list of destinations comprises the IP addresses or ports.

6. The method of claim 1, wherein the client access list comprises a first access rule, and the first access rule includes a host or domain name as a destination.

7. The method of claim 6, wherein:
   the deriving further comprises translating the host or domain name into a network address used in a first firewall rule; and
   the host or domain name is further translated into a network address used in a second firewall rule.

8. The method of claim 1, wherein the client access list is received from at least one of the client device, or an authentication service on a second computer system.

9. The method of claim 1, wherein the deriving the set of firewall rules is performed by a management module of the first computer system, and the method further comprises retrieving the set of firewall rules from the management module.

10. The method of claim 1, wherein the client access list comprises a first access rule, the first access rule includes a description, the deriving the set of firewall rules comprises translating the description into a plurality of destination addresses, and each of the set of firewall rules uses a respective one of the destination addresses.

11. The method of claim 10, wherein the description is a domain name.

12. The method of claim 1, wherein the client access list comprises a first access rule including a script.

13. The method of claim 12, further comprising:
   executing, by the first computer system, the script to query a remote computer system;
   receiving, from the remote computer system in response to the querying, a list of network addresses;
   updating the client access list by adding the list of network addresses; and
   updating, based on the updated client access list, the set of firewall rules.

14. The method of claim 1, wherein:
   the client access list comprises a first access rule that is a call to a web service being provided by a second computer system;
   the client access list further comprises at least one access rule allowing traffic to all destination addresses of those access rules in the client list that have a predetermined text string in their respective description; and
   the method further comprises receiving, from the second computer system in reply to the call to the web service, a list of network devices using an API according to metadata assigned to virtual instances in a cloud.

15. The method of claim 1, wherein:
   the client access list comprises a first access rule that identifies a first network device of the private network by specifying a service of a second computer system that can access the first network device; and
   the service is a web service that enables retrieval of a list of network devices.

16. The method of claim 1, further comprising retrieving the client access list from an authentication service that manages access to network devices in the private network.

17. The method of claim 1, wherein the client access list comprises a first access rule identifying a network device by a name, and deriving the set of firewall rules comprises translating the first access rule into multiple firewall rules.

18. The method of claim 17, wherein the name is a host name or a domain name.

19. A system, comprising:
   at least one processor; and
   memory storing instructions configured to instruct the at least one processor to:
      receive, by a first computer system implementing a first gateway to a private network, a connection request from a client device, wherein the private network comprises one or more network devices;
      after receiving the connection request, receive, by the first computer system, a client access list indicating those of the network devices in the private network that are allowed to communicate with the client device;
      start, on the first computer system, a firewall service for a first network tunnel between the client device and the first gateway;
      derive, by the first computer system, a set of firewall rules from the client access list; and
      apply, by the firewall service, the set of firewall rules to selectively block and allow network traffic between the client device and the one or more network devices in the private network.

20. A non-transitory computer readable storage medium storing computer-readable instructions, which when executed, cause a first computer system implementing a first gateway to a private network to at least:

receive, by the first computer system, a connection request from a client device, wherein the private network comprises one or more network devices;

after receiving the connection request, receive, by the first computer system, a client access list indicating those of the network devices in the private network that are allowed to communicate with the client device;

start, on the first computer system, a firewall service for a first network tunnel between the client device and the first gateway;

derive, by the first computer system, a set of firewall rules from the client access list; and apply, by the firewall service, the set of firewall rules to selectively block and allow network traffic between the client device and the one or more network devices in the private network.

* * * * *